US005978392A

United States Patent [19]
Adachi

[11] Patent Number: 5,978,392
[45] Date of Patent: Nov. 2, 1999

[54] WAVELENGTH-CONVERSION LASER

[75] Inventor: Takashi Adachi, Kanagawa-ken, Japan

[73] Assignee: Fuji Photo Film Co., Ltd., Kanagawa-ken, Japan

[21] Appl. No.: 08/877,817

[22] Filed: Jun. 18, 1997

[30] Foreign Application Priority Data

Jun. 18, 1996 [JP] Japan ..................... 8-156736

[51] Int. Cl.⁶ .............. H01S 3/13; H01S 3/109
[52] U.S. Cl. ................. 372/21; 372/22; 372/32
[58] Field of Search ............... 372/21, 22, 32, 372/98, 105, 106

[56] References Cited

U.S. PATENT DOCUMENTS 5,696,781  12/1997  Hyuga ........................ 372/21

FOREIGN PATENT DOCUMENTS 0 712 184  5/1996  European Pat. Off. ........ H01S 3/109

OTHER PUBLICATIONS

"Low–Noise Operation of a Diode–Pumped Intracavity–Doubled Nd: YAG Laser Using a Brewster Plate", Hideo NAGAI et al.; IEEE Journal of Quantum Electronics, Apr. 28, 1992; No. 4, pp. 1164–1168.

Primary Examiner—James W. Davie
Attorney, Agent, or Firm—Sughrue, Mion, Zinn, Macpeak & Seas, PLLC

[57] ABSTRACT

In wavelength-conversion laser, a solid state laser crystal is pumped with light and the wavelength of a solid laser beam emitted from the solid state laser crystal is converted by a nonlinear optical crystal disposed in a resonator for realizing type-I phase matching. An etalon and a Brewster's plate which functions as a polarization control element are provided in the resonator to realize a single longitudinal mode oscillation.

9 Claims, 1 Drawing Sheet

WAVELENGTH-CONVERSION LASER

BACKGROUND OF THE INVENTION

1. Field of the Invention

This invention relates to a solid state laser having a wavelength-conversion function, and more particularly to a wavelength-conversion laser in which an etalon and a Brewster's plate are provided in a resonator to realize a single longitudinal mode oscillation.

2. Description of the Related Art

As disclosed, for instance, in Japanese Unexamined Patent Publication No. 62(1987)-189783, there has been known a solid state laser wherein a solid state laser crystal doped with neodymium (Nd) is pumped with a laser beam emitted from a semiconductor laser or the like. In this type of a solid state laser, it is widely practiced to convert the laser beam emitted from the solid state laser to its second harmonic by a nonlinear optical crystal disposed in the resonator of the solid state laser in order to obtain a laser beam having a shorter wavelength.

Such a wavelength-conversion laser as well as other types of lasers has been required to oscillate in a single longitudinal mode in order to suppress output fluctuation resulting from longitudinal mode competition.

In order to meet this requirement, there has been developed a solid state laser in which a Nd:YVO$_4$ crystal (a YVO$_4$ crystal doped with Nd), which facilitates realization of oscillation in a single longitudinal mode, is employed as a solid laser medium, a crystal for realizing type-I phase matching is disposed in the resonator as a nonlinear optical crystal and an etalon is disposed in the resonator.

However in such a wavelength-conversion laser, utilization of anisotropy of YVO$_4$ crystal (difference in gain between the n polarization and the σ polarization) is not sufficient for polarization control and especially when the pumping power is high, σ polarization oscillation occurs, which is apt to put the laser into a multiple longitudinal mode.

SUMMARY OF THE INVENTION

In view of the foregoing observations and description, the primary object of the present invention is to provide a wavelength-conversion laser capable of realizing a single longitudinal mode by stabilizing the oscillation mode.

In accordance with the present invention, there is provided a wavelength-conversion laser wherein a solid state laser crystal is pumped with light and the wavelength of a solid laser beam emitted from the solid state laser crystal is converted by a nonlinear optical crystal disposed in a resonator for realizing type-I phase matching, characterized in that an etalon and a Brewster's plate which functions as a polarization control element are provided in the resonator to realize a single longitudinal mode oscillation.

In the wavelength-conversion laser of the present invention, by virtue of the Brewster's plate disposed in the resonator, polarization control is carried out in an excellent manner and the laser can stably oscillate in a single longitudinal mode.

This increases an allowable error in adjustment of the temperature of the resonator and permits use of a relatively simple and inexpensive temperature control means. Further the increase in the allowable error in adjustment of the temperature of the resonator results in a remarkable improvement in age-based stability as compared with conventional wavelength-conversion lasers and enables the laser to oscillate in a single longitudinal mode over a long period of time.

DESCRIPTION OF THE PREFERRED EMBODIMENT

Figure 1:
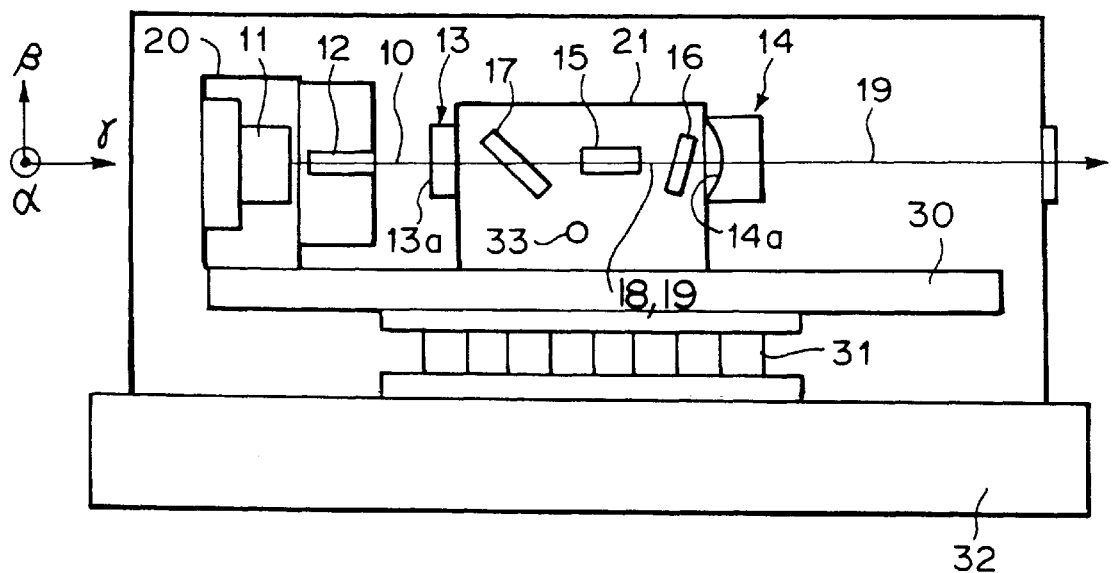
FIG. 1 is a schematic side view of a wavelength-conversion laser in accordance with an embodiment of the present invention.

In FIG. 1, a laser-diode-pumped solid state laser in accordance with an embodiment of the present invention comprises a semiconductor laser 11 which emits a laser beam 10 as a pumping beam, a condenser lens 12 which collects the laser beam 10 which is divergent light, a Nd:YVO$_4$ crystal 13 which is a YVO$_4$ crystal doped with Nd and a resonator mirror 14 disposed in front of the Nd:YVO$_4$ crystal 13 (on the side remote from the semiconductor laser 11).

A Brewster's plate 17, a MgO:LiNbO$_3$ (LiNbO$_3$ doped with MgO) crystal 15 which is a nonlinear optical crystal having periodic domain reversals and an etalon 16 are disposed between the Nd:YVO$_4$ crystal 13 and the resonator mirror 14 in this order from the Nd:YVO$_4$ crystal 13 side.

The semiconductor laser 11 is of a broad area type having an about 50 μm wide active layer and the laser beam 10 emitted therefrom is of a wavelength of 809 nm band. The direction of linear polarization of the laser beam 10 is set in the direction β in FIGS. 1 and 2. The semiconductor laser 11 is forced into a holder 20 and held there.

The condenser lens 12 may be of a refractive index type (e.g., Selfoc lens:trade name). The condenser lens 12 is spherical in one face thereof and is fixed to the holder 20 with the spherical face faced toward the Nd:YVO$_4$ crystal 13 so that the magnification of the condenser lens 12 becomes 0.8 to 1.0×. The Nd:YVO$_4$ crystal 13 is 1 mm in thickness and is positioned so that the laser beam 10 is converged in a position at a distance of 0.3±0.1 mm from the light incident end face thereof. The semiconductor laser 11 and the condenser lens 12 are mounted on the holder 20 and the assembly of these elements will be referred to as "the pumping assembly", hereinbelow.

The etalon 16 is formed of, for instance, a 0.3 mm thick quartz plate and is inclined by 45' relative to the optical axis. The Brewster's plate 17 is formed of a 0.385 mm thick quartz plate.

The Nd:YVO$_4$ crystal 13 emits light having a wavelength of 1064 nm when neodymium ions in the Nd:YVO$_4$ crystal 13 are excited by the laser beam 10. The light incident face 13a of the Nd:YVO$_4$ crystal 13 is provided with a coating which is highly reflective for light of 1064 nm (reflectance of not smaller than 99.9%) and highly transmissive for the pumping laser beam 10 of 809 nm (transmittance of not smaller than 90%). The light emanating end face of the Nd:YVO$_4$ crystal 13 is provided with a coating which is highly transmissive for light of 1064 nm.

The mirror surface 14a of the resonator mirror 14 is provided with a coating which is highly reflective for light of 1064 nm (reflectance of not smaller than 99.9%) and highly transmissive for light of 532 nm (transmittance of not smaller than 90%).

Accordingly light of 1064 nm is confined between the light incident end face 13a of the Nd:YVO$_4$ crystal 13 and the mirror surface 14a of the resonator mirror 14 and causes laser oscillation, thereby generating a laser beam 18 having a wavelength of 1064 nm. After subjected to type-I phase matching by the MgO:LiNbO$_3$ crystal 15, the laser beam 18 is converted to its second harmonic 19 having a wavelength of 532 nm. The second harmonic 19 mainly emanates from the resonator mirror 14.

In this embodiment, the Nd:YVO$_4$ crystal 13 is cut along a-axis and is 1 mm in thickness, the MgO:LiNbO$_3$ crystal 15 is 2 mm in length, the radius of curvature of the resonator mirror 14 is 50 mm and the distance between the light incident end face 13a of the Nd:YVO$_4$ crystal 13 and the mirror surface 14a of the resonator mirror 14 forming the resonator is about 11 mm.

Figure 2:
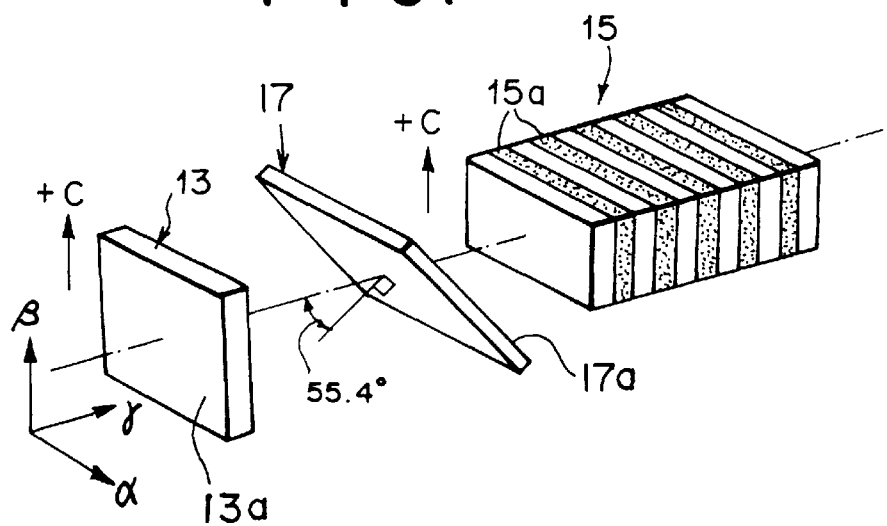
FIG. 2 is a perspective view showing an important part of the laser.

The crystals 13 and 15 are positioned so that their c-axes extend in the direction of β as shown in FIG. 2. The periodic domain reversals of the MgO:LiNbO$_3$ crystal 15 are formed at pitches of about 7.0 μm so that phase matching is obtained at a temperature at which the central wavelength of the laser beam 10 emitted from the semiconductor laser 11 becomes 809 nm.

The Brewster's plate 17 as the polarization control element is positioned so that the solid laser beam 18 impinges upon the plate 17 at 55.4°. Only the part of the light of 1064 nm linearly polarized in the direction of β passes through the Brewster's plate 17 and accordingly the oscillating light of 532 nm is also polarized in the direction β.

Further the end face 17a of the Brewster's plate 17 facing toward the resonator mirror 14 is provided with a coating which is highly reflective for light of 532 nm (reflectance of not smaller than 95%) and highly transmissive for light of 1064 nm (transmittance of not smaller than 99.8%) so that light of 532 nm which is generated by the MgO:LiNbO$_3$ crystal 15 and travels toward the Nd:YVO$_4$ crystal 13 is reflected by the Brewster's plate 17 outside the resonator, whereby only the second harmonic 19 of 532 nm is emanated from the resonator mirror 14 and fluctuation in the output due to interference between the second harmonic 19 of 532 nm and the light of 532 nm which is generated by the MgO:LiNbO$_3$ crystal 15 is suppressed.

The etalon 16 makes the oscillation mode of the solid state laser a single longitudinal mode and the light incident end face of the etalon 16 is provided with an antireflection coating which is 24% in reflectance for light of 1064 nm and is not larger than 0.5% for light of 532 nm. The Nd:YVO$_4$ crystal 13, MgO:LiNbO$_3$ crystal 15, the etalon 16, the Brewster's plate 17 and the resonator mirror 14 are mounted on a block 21 and the assembly of these elements will be referred to as "the resonator assembly", hereinbelow.

The resonator assembly and the aforesaid pumping assembly are bonded to a base plate 30 which is fixed to a package base 32 by way of a Peltier element 31.

A thermistor 33 mounted in the resonator assembly detects the temperature in the resonator, and a temperature control circuit (not shown) controls the current to the Peltier element 31 on the basis of the temperature detected by the thermistor 33 to keep the temperature in the resonator at a predetermined temperature.

Since it is preferred that the elements on the base plate 30 be uniform in temperature, it is preferred that the holder 20, the block 21 and the base plate 30 be formed of a material such as copper or alloy thereof having a high thermal conductivity. Further bonding of the elements is preferably made by use of solder or adhesive having a high thermal conductivity. However even normal adhesive such as epoxy adhesive may be used so long as the adhesive layer is small in thickness (e.g., not thicker than 10 μm) and the heat transfer resistance is small.

In the embodiment of the present invention described above, the solid laser beam 18 is subjected to polarization control by the Brewster's plate and is made to oscillate in a single longitudinal mode by the etalon 16, whereby the second harmonic 19 is also made to oscillate in a single longitudinal mode. That is, with arrangement of the crystals 13 and 15 and the Brewster's plate 17 shown in FIG. 2, the solid laser beam 18 constantly oscillates in π polarization (orientation of polarizationis in the direction β) and accordingly is maintained in a single longitudinal mode.

Accordingly the temperature range over which a single longitudinal mode can be maintained is widened, and the age-based stability is remarkably improved as compared with conventional wavelength-conversion lasers. Further even if the pumping power is increased, the laser can oscillate stably in a single longitudinal mode.

When the specification of the coating of the Brewster's plate 17 for light of 532 nm (the coating may be omitted if necessary) is changed, the order of the MgO:LiNbO$_3$ crystal 15, the etalon 16 and the Brewster's plate 17 may be other than that described above.

The nonlinear optical crystal that effects type-I phase matching need not be limited to the MgO:LiNbO$_3$ crystal 15 having periodic domain reversals but may be MgO:LiNbO$_3$ crystal without periodic domain reversals, or other crystal such as LiTaO$_3$, β-BBO, LBO, Ba$_2$NaNb$_5$O$_{15}$ or the like.

When a crystal having periodic domain reversals is used as the nonlinear optical crystal that effects type-I phase matching, a LiNbO$_3$ crystal, a LiTaO$_3$ crystal or a KTP crystal having periodic domain reversals may also be used.

What is claimed is:

1. A wavelength-conversion laser wherein a solid state laser crystal is pumped with light and the wavelength of a solid laser beam emitted from the solid state laser crystal is converted by a nonlinear optical crystal disposed in a resonator for realizing type-I phase matching, characterized in that an etalon and a Brewster's plate which functions as a polarization control element are provided in the resonator to realize a single longitudinal mode oscillation.

2. A wavelength-conversion laser as defined in claim 1 in which said nonlinear optical crystal has periodic domain reversals.

3. A wavelength-conversion laser as defined in claim 2 in which said nonlinear optical crystal having periodic domain reversals is a MgO:LiNbO$_3$ crystal.

4. A wavelength-conversion laser as in one of claims 1–3, in which the laser crystal comprises Nd:YVO4.

5. A wavelength-conversion laser as defined in claim 4 in which the Brewster's plate is positioned so that a c-axial direction of the YVO4 and a c-axial direction of the non-linear optical crystal are matched and a polarization parallel to c-axis becomes p-polarization.

6. A wavelength-conversion laser as defined in claim 4 in which the Brewster's plate is provided with an antireflection coating with respect to fundamental light.

7. A wavelength-conversion laser as defined in claim 4 in which a resonator assembly and a pumping assembly are bonded to a base plate which is fixed to a package base by way of a Peltier element, a thermistor mounted in the resonator assembly detects a temperature in the resonator, and a temperature control circuit controls a current to the Peltier element based on the temperature to keep the temperature in the resonator at a predetermined value.

8. A wavelength-conversion laser as defined in claim 4 in which an order of placement of elements is YVO4 crystal, the Brewster's plate, the non-linear optical crystal, the etalon and the mirror.

9. A wavelength-conversion laser as defined in claim 8 in which the Brewster's plate is provided with a highly reflective coating with respect to wavelength-conversion light.

* * * * *